United States Patent [19]

Rohr et al.

[11] Patent Number: 4,459,095
[45] Date of Patent: Jul. 10, 1984

[54] BLOW-MOLDING MACHINE FOR FABRICATING HOLLOW BODIES FORMED OF THERMOPLASTIC MATERIALS

[75] Inventors: Peter Rohr, Rothenburg; Otto Burri, Kriens, both of Switzerland

[73] Assignee: Hoover Universal, Inc., Ann Arbor, Mich.

[21] Appl. No.: 351,276

[22] Filed: Feb. 22, 1982

[30] Foreign Application Priority Data

Feb. 24, 1981 [CH] Switzerland .................. 1205/81

[51] Int. Cl.³ .................. B29C 17/07; B29C 17/12
[52] U.S. Cl. .................. 425/527; 264/536; 264/543; 425/211; 425/532; 425/534; 425/541; 425/806
[58] Field of Search ........ 425/211, 532, 534, 527, 425/530, 541, 540, DIG. 806 R, DIG. 806 A; 264/542, 543, 536

[56] References Cited

U.S. PATENT DOCUMENTS

| 3,583,031 | 6/1971 | Kader et al. | 425/534 X |
| 4,043,734 | 8/1977 | Dybala et al. | 425/532 |
| 4,124,668 | 11/1978 | Frohn | 425/527 X |

FOREIGN PATENT DOCUMENTS

| 47-16558 | 5/1972 | Japan | 425/540 |
| 928529 | 6/1963 | United Kingdom | 425/540 |

Primary Examiner—Jan H. Silbaugh
Attorney, Agent, or Firm—Stephenson and Boller

[57] ABSTRACT

At a blow-molding machine for fabricating hollow blow-molded articles from a thermoplastic material a hollow blow mold is moved back and forth with a swinging or pendulum movement upon a transport device containing a mold-supporting platform between a receiving station for the hose-like thermoplastic material to be blow molded and a blow molding station. The platform carries article receiving and transfer means which move in unison therewith and serve to receive the hollow blow-molded bodies or articles formed at the blow-molding station and for delivering the same to an article outfeed or delivery station. To reduce the energy requirements for operating the machine, and specifically, for the movement of the transport device and the various facilities carried by the swing platform and to thereby increase the production capacity of the blow-molding machine itself, the receiving station, the blow-molding station and the delivery station are essentially arranged in a common plane which is substantially horizontally disposed in space. The blow-molding machine is designed such that a substantially arcuate-shaped or curved path of travel is described by the platform, although the platform itself remains essentially in a horizontal position as the transport device moves through such arcuate-shaped path of travel. Such arcuate-shaped path of travel of the transport device is located below the common horizontal plane containing the various work stations and such path of travel extends in a concave configuration with respect to such plane. The transfer means for receiving and delivering the hollow blow molded bodies may be provided with a deflashing device for removing flash from the hollow molded bodies at least no later than the time when the same reach the delivery or outfeed station.

14 Claims, 5 Drawing Figures

BLOW-MOLDING MACHINE FOR FABRICATING HOLLOW BODIES FORMED OF THERMOPLASTIC MATERIALS

BACKGROUND OF THE INVENTION

The present invention relates to a new and improved construction of a blow-molding machine for the fabrication of hollow molded bodies or articles formed of thermoplastic materials.

Generally speaking, the blow-molding machine of the present development is of the type wherein the hollow blow molded bodies or articles are blow-molded in a hollow blow mold. This hollow blow mold is transported to-and-fro by means of a transport device containing a platform movable between a receiving station for receiving the hose-like thermoplastic material to be blow molded and a blow-molding station. The platform is equipped with means for receiving the hollow molded bodies or articles at the blow-molding station and for delivering the same to a delivery or outfeed station, such receiving means moving to-and-fro simultaneous with the to-and-fro movement of the hollow blow mold upon the platform between the blow-molding station and the delivery station.

It is well known in the blow-molding art that the transport devices of the blow-molding machine must move appreciable loads with considerable velocities. Between the individual work stations of the blow-molding machine a considerable mass must be accelerated and subsequently again decelerated i.e. braked prior to entry at the next successive work station, because the transport operation proceeds stepwise and cyclically. This large mass typically consists of the mass or weight of the devices which must be transported between the work stations, for instance a multi-part hollow blow mold along with the therewith operatively correlated mold closure facility of unit, and the inherent mass or weight of the transport device.

Frequently the transport path extends horizontally in space. This is afflicted with the drawback that a certain work stations the devices or facilities which are operative during the relevant working operation, for instance a blow molding head, must be intermittently shifted elevationally or laterally, in order to allow the transported device, for instance a closed mold unit, to move into such stations.

In order to at least partially eliminate such complications proposals have been made to design the transport paths such that they are inclined, in order that a transport step does not occur purely in the horizontal direction but also in the vertical direction, whereby a device can be introduced from below into a work station. However, in this case the otherwise advantageous vertical component of the travel path acts in a disadvantageous manner upon the transport operation and the equipment expenditure needed to accomplish the same, since it is necessary to now overcome the force of gravity through the use of an appreciable amount of energy and to terminate the transport step as free as possible from shock or impacts.

Consequently, the above-explained facts have resulted in massive and/or complicated constructions of blow-molding machines which are therefore not only extremely expensive but also prone to malfunction.

In order to reduce the load which must be transported attempts have been made to simplify the devices which have to be transported in order to save energy when moving these masses. Thus, there have been limited either the number of hollow molded bodies or articles which can be simultaneously fabricated, i.e. in a parallel production operation, or else a work operation which otherwise would have to be carried out during the progression of a transport step is eliminated and in lieu thereof there is provided an additional work station and related transport means for accomplishing the eliminated work step or operation. However, these measures prolong either the total production operation of the hollow blow molded bodies or else limit the production output of the machine, since fewer products can be simultaneously fabricated.

In U.S. Pat. No. 3,594,861, granted Jul. 27, 1971 there is disclosed a blow-molding apparatus wherein an extruder head deposits a parison into a mold which is supported by a linkage arrangement for movement into a position beneath the extruder head, through an aracuate path of travel, to a location remote therefrom. A second mold is likewise similarly mounted such that when the first mold moves out of its coacting relationship with the extruder head the second mold moves into a coacting position beneath the extruder head where parison can be deposited into such second mold. Apart from the possibility of cyclically operating the first and second swivelably mounted molds attention is not particularly paid as to the nature of and where the various stations are located and in what spatial relationship to one another or what operations, apart from the conventional mold actuation and filling steps, can be performed during the shifting of the mold from a position beneath the extruder to another remote location therefrom.

SUMMARY OF THE INVENTION

Therefore, with the foregoing in mind it is a primary object of the present invention to provide a new and improved construction of blow-molding machine which enables reducing the energy expenditure for the transport of the work devices, i.e. the energy expenditure for the acceleration and deceleration or braking of the masses which are to be moved during operation of the blow molding machine.

A further object of the present invention aims at providing a new and improved construction of blow-molding machine which enables transporting larger, if desired, even combined blow molding devices or facilities, so that during a transport step it is possible to perform more than only one operation needed for the fabrication of the blow molded articles.

Still a further significant object of the present invention and in keeping with the foregoing objectives is to construct the blow-molding machine such that its output can be increased, there is simplified the design of the blow-molding machine itself, so that there is possible a more reliable disturbance-free operation and longer service life of the equipment with reduced energy requirements in relation to the masses which are moved, and the entry of a blow-molding device or facility at a work station is simplified.

Another important object of the present invention concerns an improved blow-molding machine wherein therein can be beneficially exploited the swinging movements of a swingably mounted platform during the molding operations, so as to reduce the energy requirements needed for operation of the system and for moving and braking the platform.

Still a further important object concerns an improved construction of blow-molding machine which utilizes a novel arrangement and construction of transport device containing a multi-part platform structure.

Now in order to implement these and still further objects of the invention, which will become more readily apparent as the description proceeds, the inventive blow-molding machine is generally manifested by the features that there is provided a swing platform containing a mold device or facility for blow molding hollow bodies thereat. The platform is structured and mounted such that it moves through a predetermined arcuate-shaped path of travel between a plurality of work stations, at least two work stations, which are located essentially in the same plane. During such time as the platform moves through the arcuate-shaped path of travel it remains in a position essentially parallel to itself.

According to further more specific aspects of the blow-molding machine of the present development there are provided as the plurality of work stations a receiving station where hose-like thermoplastic material or what is also sometimes referred to as parisons are deposited into a blow mold, a blow-molding station where the deposited hose-like material or hose structures are blow molded into hollow bodies or articles and a delivery or outfeed station where the hollow bodies or articles are then outfed. The receiving station, the blow molding station and the delivery station are disposed in a common plane which is positioned essentially horizontally in space. The platform of the transport device supports the hollow blow mold and its mold closure unit, as well as the receiving and transfer means for receiving the hollow bodies formed at the blow-molding station. The arcuate-shaped travel path, along which moves the platform while it remains essentially in horizontal position, is located beneath the aforementioned common horizontal plane containing the work stations and such travel path is concave with respect to such plane. The transfer means for the reception and delivery of the hollow molded bodies and which is likewise mounted at the platform can be provided, if desired, with a deflashing device for removing flash from the molded hollow bodies or articles. The deflashing device accomplishes the deflashing operation at the latest when the hollow molded bodies reach the delivery station, and preferably such deflashing device is effective during the movement of the article transfer means from the blow-molding station to the delivery station.

By virtue of the arcuate-shaped path of travel of the swing platform the energy requirements for the acceleration and deceleration or braking of the masses which are to be moved is minimized, since the vertical components of the path of travel which are present at all times during the acceleration and also during the deceleration or braking of the masses, in other words the effective gravitational force, actively participates in a beneficial manner for the acceleration and deceleration of the moved masses, and the inertia of the accelerated masses also positively contributes to movement of the masses upon overcoming the gravitational force component. The swivel or swinging movement of the platform constitutes an advantage in minimizing the energy requirements. The vertical component of the path of travel i.e. the gravitational force, also contributes in an advantageous manner to an orderly and proper arrival of the transport device beneath related devices or facilities participating in the working or blow-molding operation. The transport step is accomplished essentially free of impacts of jerky movements, thus positively affecting the reliability and disturbance-free operation of the individual elements and beneficially contributing to the prolonged service life of the entire blow-molding machine and also the complete fabrication operation.

The desirable arrangement of the path of travel of the platform of the transport device as contemplated by the invention, in other words the thus attained facilitation of the transport movements, thus renders possible the use of a combined, i.e. heavy or massive device which, however, is capable of accomplishing more than a single operation during a transport step.

Such combined devices, for instance a hollow mold together with its mold closure unit or device and the transfer means for the receiving and delivery of the hollow molded bodies or articles in conjunction with, possibly, a deflashing device, during their intermittent working operations cause impacts and vibrations or jarring movements which could be transmitted, during vibration of the platform, to other devices or facilities mounted at the platform.

Therefore, according to an advantageous further development of the present blow-molding apparatus it is proposed to construct the platform such that it is composed of at least two interconnected platform portions or parts. One of the platform portions supports the hollow mold and its mold closing and opening unit—herein sometimes simply referred to as mold closure unit—and the other platform portion or part supports the transfer means for the reception and delivery of the hollow molded articles or bodies. Between the platform portions or parts there are advantageously provided vibration-suppressing means, such as inserts or vibration or shock dampeners which at least beneficially reduce if not eliminate any vibrations which might arise. In the case where the arcuate-shaped path of travel of the platform is defined by pivotal or swivel levers arranged between the platform and a supporting structure, such as the machine frame, it is contemplated by the invention for the purpose of facilitating damping of occurring vibrations to arrange pivotal or swing levers between the one platform part as well as also between the other platform part and in each instance at the machine frame of the like.

Through the provision of a divided or multi-part platform construction it is possible to compensate for any possible inaccuracies in the construction and/or mounting of the platform supporting levers and to compensate for other possibly arising manufacturing intolerances. In this way it is possible to minimize the possibility of distorting or otherwise undesirably loading the platform, which would be the case if a unitary totally rigid platform, as opposed to the multi-part somewhat yieldable platform of the invention, were employed. Also, with the multi-part platform construction it is readily possible to dismantle and replace any part of the platform which is damaged or contains damaged or other malfunctioning facilities or units.

By virtue of the contemplated vibration-suppressing means provided for the multi-part platform there is limited the transmission of vibrations, caused by the working operations, between the devices or facilities which are conjointly transported upon the common multi-part platform. This again has a positive effect upon the functional reliability of the devices participating in the blow-molding operation and, equally, in the quality of the ultimate hollow blow molded articles which are fabricated.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
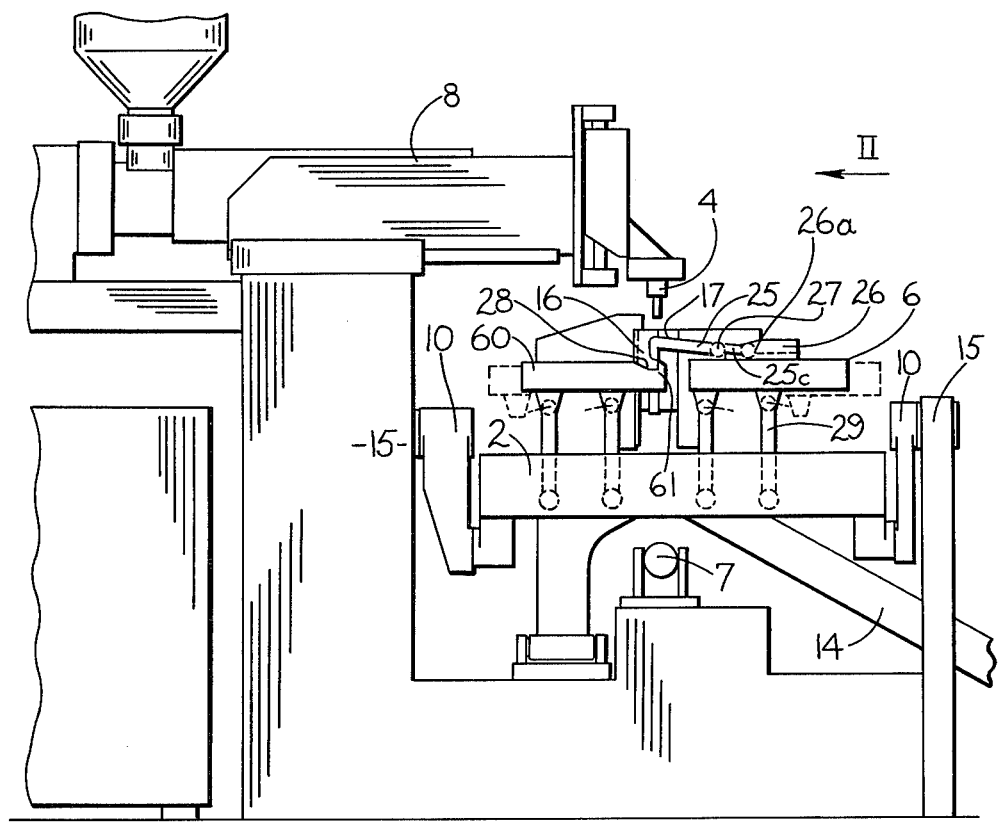
FIG. 1 is a schematic side view of a blow-molding machine according to the invention.

Describing now the drawings, it is to be understood that only enough of the construction and details of the blow-molding machine has been depicted therein in order to simplify the illustration and as needed for those skilled in the art to readily understand the underlying principles and concepts of the present development. In the exemplary embodiment of blow-molding machine the same has been assumed to serve for the fabrication of hollow blow molded bodies or articles formed of a suitable thermoplastic material. The plasticized thermoplastic material which is to be blow molded is supplied in a substantially hose-like configuration i.e. as hoses or the like, by an extruder 8 to a receiving station A containing conventional extruder heads 3, here shown as four in number purely by way of example and not limitation. The thermoplastic material is deposited into the mold cavities 1a of a hollow blow mold 1 and molded therein. This hollow blow mold 1 is mounted at a swinging or pendulum platform 2 of a transport device, generally indicated by reference character 50. Apart from supporting the hollow blow mold 1 the platform 2 further supports, among other devices or facilities, a conventional mold closure or mold closing and opening facility, merely generally schematically indicated by reference character 52 in FIG. 2. The hollow blow mold 1 is moved in conjunction with the swing platform 2 between the thermoplastic hose-receiving station A, where the extruded thermoplastic hoses are deposited into the blow mold 1, and a blow-molding station B. It will be appreciated, and as will be described more fully hereinafter this platform 2 together with the hollow mold 1 is intermittently moved back-and-forth between the receiving station A and the blow-molding station B in a cyclic fashion in accordance with the desired individual blow-molding operations. At the blow-molding station B there is introduced into the upper end of the closed hollow mold 1 the blow mandrils 4a of a blow-molding head 4, and there is thus then accomplished the actual blowing or so-called calibration step. After this blow-molding step the formed hollow bodies or articles 18 remain suspended at the blow mandrils or nozzles 4a or equivalent structure, the hollow mold 1 is opened and in conjunction with the return movement of the platform 2, now towards the right of the showing of FIG. 2 back towards the receiving station A, such opened mold 1 returns to the receiving station A, in order that the opened hollow mold 1 again can receive a new supply of thermoplastic hoses which are to be blow molded.

Figure 2:
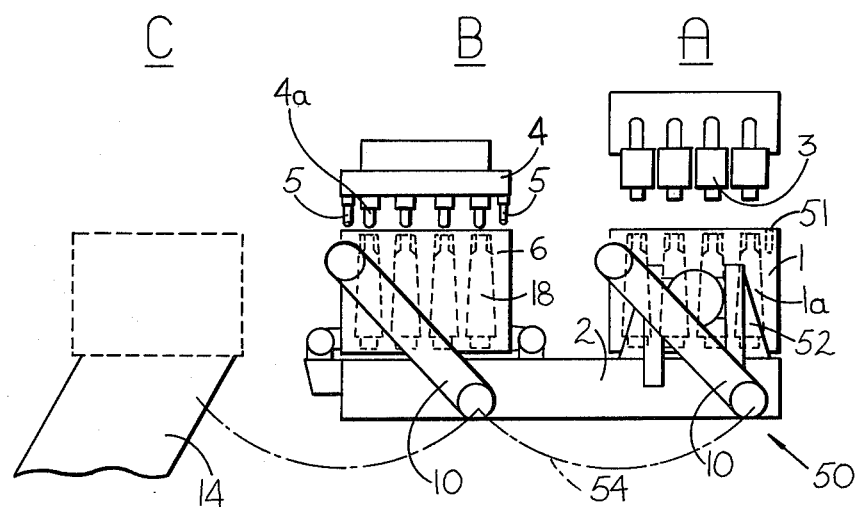
FIG. 2 schematically illustrates the arrangement of the individual work stations essentially looking in the direction of the arrow II of FIG. 1.

As will be evident by referring to FIG. 2, at the left-hand portion of the platform 2 there are provided receiving and transfer means 6 for receiving the hollow molded bodies or articles 18 which depend from the blowing mandrils 5 at the blow-molding station B and these transfer means 6 further serve to transport and deliver the hollow molded bodies 18 to an outfeed or delivery station C. This outfeed or delivery station C for the blow molded bodies or articles 18 has been shown simply in broken lines in the illustration of FIG. 2 and is located above a chute or slide 14 or other suitable discharge facility, by means of which the formed hollow bodies or articles 18 can be removed from the blow-molding machine. Along with the movement of the swing or swivel platform 2 of the transport device 50 in the direction of the outfeed or delivery station C, at the left-hand side of the showing of FIG. 2, the transfer means or device 6 for the reception and delivery of the hollow molded bodies 18 arrives at the region of the outfeed or delivery station C. At this location such transfer means 6, the construction of which will be discussed more fully hereinafter, is opened so that the molded hollow bodies 18, previously positionally retained by such transfer means 6, are released and then drop through the chute or slide 14 towards another suitable processing location.

As particularly well seen by referring to FIG. 2, the receiving station A, the blow-molding station B and the article delivery or outfeed station C are arranged essentially in a common plane which is substantially horizontally disposed in space. The platform 2 which supports the hollow blow mold 1 together with the mold closure unit or facility 52, and also the transfer means 6 for the reception of the molded hollow bodies or articles 18 formed at the blow-molding station B and for the transfer of the thus received blown articles to the outfeed or delivery station C, is mounted such that the platform 2 describes an arcuate-shaped path of travel, generally indicated by reference character 54 with broken lines in FIG. 2, as the platform moves between the various stations A, B and C in one or the other direction. During such time as the platform 2 moves along such curved or arcuate-shaped path of travel the platform 2 itself remains however essentially in its horizontal position. This path of travel 54 extends below the aforementioned common horizontal plane at which there are arranged the work stations A, B and C and is concave with respect to such work station plane. The arcuate-shaped movement or travel path 54 of the platform 2 is realised, in the exemplary embodiment under discussion, through the provision of swivel or pivotal levers 10 which are pivotably attached to and support the platform 2 of the transport device 50 so that it can accomplish this desired pendulum-type or swing motion. These swivel levers 10 are arranged substantially in a parallelogram-type configuration between the platform 2 and a suitable mounting structure, such as the machine frame 15 of the blow-molding machine, to which they are also pivotably connected.

In the exemplary embodiment of blow-molding machine under discussion the transport device 50 thereof has been depicted suspended at the machine frame 15 by means of the swivel or pivotal levers 10 and also contains the platform 2 with which there is operatively connected a suitable drive or drive means 7 by means of which the entire transport device can be moved to-and-fro, i.e. swung back and forth between the various work stations A, B and C and vice versa, as heretofore explained.

It is conceivable to move the platform 2 along the described arcuate-shaped travel path 54 by a different arrangement than the swivel lever system 10 described above. For instance, there could be provided curved or arcuate-shaped rails along which the platform 2 can move while supported upon travelling rolls or the like. Irrespective of the mechanism for imparting the swinging or pendulum-type movement to the platform 2 along the desired arcuate-shaped path of travel 54, in all instances regardless of how such movement is obtained, it will be recognised that the force of gravity assists in both moving or accelerating the platform 2 from one work station to another and equally is helpful in decelerating or braking the platform-movement when it arrives at each desired work station. In particular, there is beneficially exploited the pendulum movement of the platform 2 throughout the desired predetermined path of travel 54 to accomplish these goals, and the force of gravity which is made use of allows moving and braking large masses with minimum energy requirements.

Since the described construction of the transport device 50 requires a relatively small amount of force for accelerating and braking the system, the blow-molding facilities or units mounted at the platform 2 can be of more massive construction without any reservations in this regard; in other words, these blow-molding facilities can be constructed so that they can simultaneously fabricate a larger quantity of molded hollow bodies or articles 18.

Figure 5:
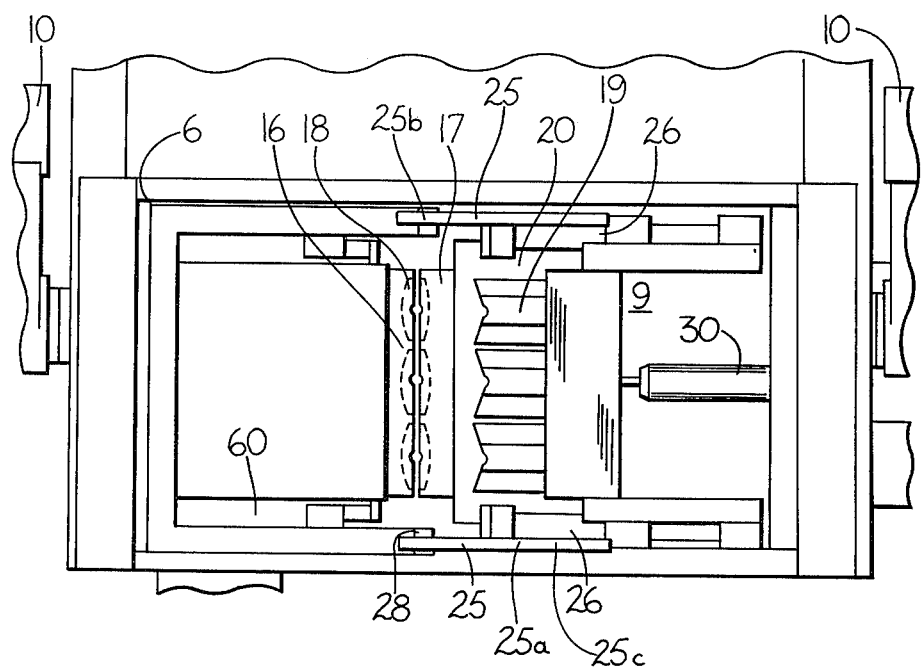
FIG. 5 is a top plan view of a portion of the blow-molding machine shown in FIG. 1, specifically illustrating the article receiving and transfer means for the reception and delivery or outfeed of the hollow molded bodies or articles.

It is also possible to equip the transfer device or means 6 which receives the blow molded bodies 18 at the blow-molding station B and transfers such to the outfeed or delivery station C, with a deflashing device or deflashing means 9, as best seen by referring to FIG. 5. Such deflashing device 9 serves to remove flash or the like from the molded hollow bodies or articles 18 for instance during their transit between the blow-molding station B and the outfeed or delivery station C, but at the latest however upon reaching the delivery station C. As will be explained more fully hereinafter the flash is advantageously removed from the molded hollow bodies 18 during such time as the transfer means 6 releasably retains the molded hollow bodies 18 and is in the process of transferring them from the blow-molding station B to the article delivery station A. By virtue of this arrangement it is possible during a cycle step to simultaneously accomplish two different operations.

Figure 3:
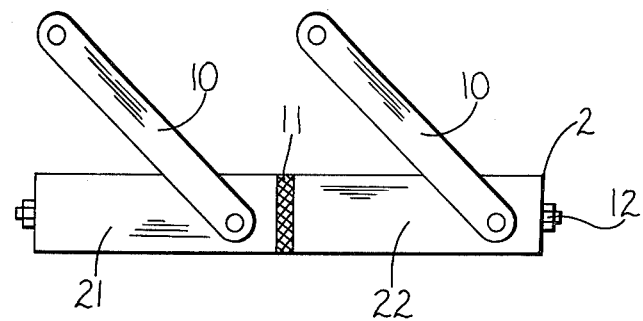
FIG. 3 illustrates a first possible construction of multi-part platform of the transport device.
Figure 4:
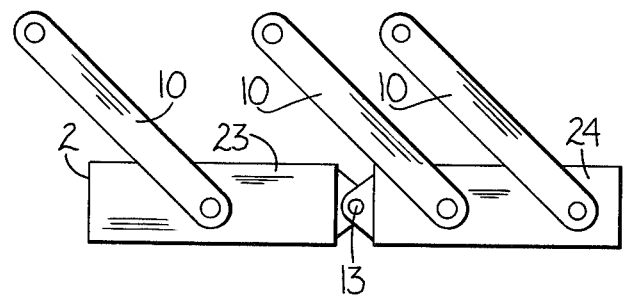
FIG. 4 illustrates a further embodiment of multi-part platform construction.

In FIGS. 3 and 4 there are shown two different possible modified constructions of platform 2 from the arrangement shown in FIG. 1. In each case the here multi-part platform 2 is divided into at least two platform parts or portions 21, 22 (FIG. 3) and 23, 24 (FIG. 4). At the platform part 22 of the platform construction of FIG. 3, and equally at the platform part 24 of the platform construction of FIG. 4, there is mounted the hollow mold 1 together with the mold closure facility or unit 52, and at the respective second or other platform part 21 and 23 of the platform constructions of FIGS. 3 and 4 there are mounted the article receiving and transfer means 6 which serve to receive and deliver the hollow molded bodies or articles 18 as well as the deflashing means or device 9 serving to remove flash or the like from the molded hollow bodies or articles 18.

In the platform construction of FIG. 3 the multi-part platform 2 is designed such that between both platform parts or portions 21 and 22 there are incorporated suitable vibration-suppressing means 11, here shown in the form of vibration-suppressing inserts or vibration dampeners. These vibration-suppressing inserts 11 are advantageously positioned between both of the platform parts 21 and 22 and serve to dampen the transmission of vibrations therebetween, which are brought about by the operation of the individual blow-molding facilities or devices mounted upon the platform 2 as heretofore described. Therefore, each blow-molding facility or unit is protected against being subjected to disturbing vibrations which might have been caused by any other blow-molding facility or unit. In the arrangement of FIG. 3 the platform parts 21 and 22 of the multi-part platform 2 are retained relatively immovably together through the use of suitable interconnecting means 12, here in the form of tension bolts or equivalent fastening expedients, although the platform parts may shift slightly to compensate for slight errors or irregularities in the lever mounting or suspension system which might be present.

On the other hand, in the platform construction of FIG. 4 the platform parts 23 and 24 of the multi-part platform 2 are interconnected by a suitable connection device or coupling 13 which is also advantageously structured to suppress vibrations and allows for correcting, to a certain extent, any misalignment between the platform parts 23 and 24 and also compensating for possible inaccuracies in the manufacturing tolerances of the mounting levers 10 or their mounting. Such inaccuracies or errors are also compensated by the vibration-suppressing inserts 11 of the arrangement of FIG. 3, as heretofore explained. In each case, the pivotal or swivel levers 10 are arranged between the machine frame 15 and the related two platform parts or portions 21, 22 (FIG. 3) or 23, 24 (FIG. 4), as the case may be. By virtue of the multi-part platform design here contemplated there is imparted greater versatility to the equipment because, apart from the capability of correcting for possible irregularities or manufacturing intolerances in the mounting arrangements or misalignment of the platform parts, any platform part or facility thereon which is damaged can be readily exchanged along with the blow-molding facilities or units located thereon without the entire platform 2 and all of its thereon supported blow-molding facilities or units having to be replaced.

Continuing, the transfer means 6 which serve to receive and deliver the molded hollow bodies 18, as best seen by referring to FIG. 5, are provided at both sides of the molded hollow bodies 18 which are to be seized while depending from the blow mandrils or nozzles 4a or the like, with to-and-fro movable masks 16 and 17. These masks 16 and 17, which may be in the form of conventional grate or grid-like mask structures, serve to fixedly retain the seized hollow molded bodies or articles 18 and to release such hollow molded bodies at the appropriate time for deposition at the delivery station C. The masks or mask means 16 and 17 are advantageously structured such that they can be used for the deflashing of the molded hollow bodies 18 by the deflashing device 9 which contains deflashing elements or punch cutters 19 or equivalent structure which can move to-and-fro relative to the hollow molded bodies or articles 18. These masks or mask members 16 and 17, at least one of which has the mentioned grate or gridlike structure, here at least the mask 17 for receiving the cutters 19, are located to both sides of the hollow bodies 18 received therebetween and can be moved to-and-fro relative to the hollow bodies 18 which are to be received by such masks 16 and 17 and ultimately released therefrom. These masks 16 and 17 are guided by means of the pivotal or swivel levers 29, as best seen by referring to FIG. 1, which, on the one hand, are connected with the movable support frames or holders 60 supporting the masks 16 and 17 and, on the other hand, with the platform 2. The mask or masks 17 at one side of the transfer means 6 are connected with a punch-like cutter device 20 which contains the deflashing or punch cutters 19 for the deflashing operation. This punch device 20 of the deflashing device 9 is connected with the mask or masks 17 and movable back-and-forth along therewith. The punch device 20 is designed such that it can carry out a punching or deflashing operation for deflashing of the molded articles in the article retaining position of the coacting masks 16 and 17. This article retaining position has been shown in FIG. 1. The masks 16 and 17 are moved together by means of their supports 60 and during such movement the hollow molded bodies 18 are retained fixedly in position therebetween. In this position the deflashing or punch cutters 19 are moved in the direction towards the retained hollow molded bodies or articles 18 and then accomplish the deflashing operation.

As also will be recognized by referring to FIG. 5 a suitable drive, such as a servomotor 30 is provided for appropriately driving the punch cutter 19. The drive for the to-and-fro movement of the masks 16 and 17 has not been particularly shown since any conventional drive can be used for this purpose and such does not constitute subject matter of the instant invention. However, in FIG. 1 there has been shown in solid lines the closed article-retaining position of the holding masks 16 and 17 and their mask supports 60. Equally, in FIG. 1 there has been depicted with phantom lines the retracted or opened position of the masks 16 and 17 and their mask supports 60.

The masks or mask means 16 and 17, during the punching or deflashing operation, assume their article-retaining position, as the same has been depicted both in FIG. 1 and also in FIG. 5, and in which article-retaining position these masks or mask means 16 and 17 are releasably interlocked by means of a suitable locking mechanism 25.

In the exemplary embodiment under discussion the locking mechanism 25 comprises at least one locking hook or element 25a, but a greater number such as the two depicted locking hooks or elements 25a can be used. Each such locking hook or element 25a is pivotably mounted at the mask 17 or its related mask support 60, in other words at the mask or mask structure directly operatively correlated to the punch device 20. Each such locking hook or element 25a can be latched into or otherwise engaged with the oppositely arranged mask 16 or its support structure 60 or a part cooperating therewith, here the receiving opening 61 of FIG. 1, so that the masks 16 and 17 can be appropriately held in their article-retaining position. Each locking hook or element 25a can be guidably moved into its mask-retaining or closing position or its mask-releasing or opening position, as the case may be, as a function of the movement of the punch or deflashing cutters 19 used during article deflashing towards and away from the molded hollow bodies 18, respectively. Each locking hook 25a is constructed as a double-arm lever 25b, 25c and is pivotably mounted at its pivot point or pivot 27 at the mask support 60 of the mask 17 connected with the punch device 20. The lever arm 25b confronting the mask or masks 16 is structured such that it can lockingly engage into the mask 16 or its mask support 60, for which purpose there is here provided a receiving element 28 containing the hook receiving opening 61 for the related locking hook 25a, as best seen by referring to FIGS. 1 and 5. The other lever arm 25c of the double-arm locking hook or element 25 is guided in a controlled fashion by any suitable control device, here shown as a control cam 26 which is connected with the punch or deflashing cutters 19 and participates in their movement. The guide surface or track, generally indicated by reference character 26a, of the control cam 26 is structured such that the latching or engaging portion of the locking hook 25a is raised when the punch or deflashing cutters 19 are disposed in spaced relationship from the hollow molded bodies 18 which are to be deflashed. With the movement of the punch or deflashing cutters 19 in the direction of the hollow molded articles or bodies 18 which are to undergo deflashing the locking hooks 25a are guided so that they lockingly engage at the receiving or engagement portions 28 of the mask structure 16.

The movements, and specifically the movements of the masks or mask means 16 and 17 into their article-retaining or holding position and the movement of the locking hooks 25a into the locked or engaging position for the masks are coordinated in a timewise sequence with respect to one another such that the masks 16 and 17 are locked by means of the locking hooks 25a before the punch cutters 19 come into play for the deflashing operation.

Advantageously, both of the masks 16 and 17 are held together in their article-retaining position by means of suitable centering pins, which are not particularly shown since such construction is conventional in the blow-molding art.

It is also important that the hollow blow mold 1 is positionally fixed during the actual blow-molding operation at the blow-molding station B with respect to the blow-molding head 4 by means of centering pins 5 or equivalent structure arranged between the blow-molding head 4 and the hollow blow mold 1. When the hollow blow mold 1 is in its closed position at the blow-molding station B, for the purpose of performing the described blow-molding or calibration operation, the blow-molding head 4 together with the centering pins 5 are downwardly moved towards the closed hollow mold 1, so that the centering pins 5 enter the hollow mold 1. Consequently, the centering pins 5 enter the hollow blow mold 1 in a mold fixing position, for which purpose there are provided guides 51 suitable for receiving the centering pins 5, these guides 51 being shown in broken lines at the hollow mold 1 of the arrangement of FIG. 2.

While there are shown and described present preferred embodiments of the invention, it is to be distinctly understood that the invention is not limited thereto, but may be otherwise variously embodied and practiced within the scope of the following claims.
ACCORDINGLY,
What we claim is:

1. A blow-molding machine for fabricating hollow molded bodies formed of thermoplastic material, comprising:

means defining a plurality of work stations disposed along side each other in a substantially common horizontal plane;

said plurality of work stations including at least a receiving station where thermoplastic material to be molded is deposited and a blow molding station where the thermoplastic material is blow molded to form said hollow molded bodies;

a swing platform mounted for swinging movement between said plurality of work stations located in said common horizontal plane;

means mounting said platform for swinging movement between said plurality of work stations in said common horizontal plane;

at least one blow mold movably mounted on said platform for opening and closing movement to enable blow molding of the hollow molded bodies;

transfer means mounted on said platform along side said blow mold for engaging and transporting blow molded hollow bodies at said blow molding station; and said swing platform being swingably movable between a first position in which said blow mold is positioned at said receiving station for receiving said thermoplastic material and said transfer means is positioned at said blow molding station for engaging blow molded hollow bodies at said blow molding station and a second position in which said blow mold is at said blow molding station and said transfer means is to one side of said blow molding station.

2. The blow-molding machine as defined in claim 1, wherein:

said transfer means is operable to transport blow-molded hollow bodies from said blow molding station to a further station located in said common horizontal plane where the blow-molded hollow bodies are outfed from the blow-molding machine.

3. The blow-molding machine as defined in claim 2, wherein:

said platform carries deflashing means coacting with said transfer means for removing flash from the blow-molded hollow bodies.

4. The blow-molding machine as defined in claim 3, wherein:

said platform is structured as a multi-part platform.

5. The blow-molding machine as defined in claim 4, wherein:

said multi-part platform is provided with vibration-suppressing means for suppressing the transmission of vibrations from one platform part to another platform part.

6. A blow-molding machine for fabricating hollow molded bodies formed of thermoplastic material, comprising:

means defining a receiving station for receiving thermoplastic material and depositing such in a blow mold for forming the blow-molded hollow bodies;

means defining a blow-molding station for the blow-molding of the thermoplastic material in the blow mold to form the hollow molded bodies;

means defining a delivery station for the outfeed of the hollow molded bodies from the blow-molding machine;

transport means containing a swing platform movable with a swinging motion to such different stations;

a blow mold for forming therein the hollow molded bodies and carried on said swing platform;

said blow mold being movable to-and-fro by means of said swing platform of said transport means between said receiving station and said blow-molding station;

transfer means carried on said swing platform along side said blow mold for receiving hollow bodies which have been blown at the blow-molding station and for delivery thereof to said delivery station;

said transfer means simultaneously performing to-and-fro movements along with the to-and-fro movements of the blow mold upon the swing platform between the blow-molding station and the delivery station;

said receiving station, blow-molding station and delivery station being disposed essentially in a common plane located substantially horizontally in space;

means mounting said swing platform for movement through a substantially arcuate-shaped path of travel while said platform remains essentially in a horizontal position;

said arcuate-shaped path of travel extending below said common horizontal plane containing said receiving station, blow-molding station and delivery station and extending concavely with respect to said plane;

deflashing means coacting with said transfer means for removing flash from the hollow molded bodies; and said deflashing means deflashing said hollow molded bodies at least no later than the time said hollow molded bodies arrive at the delivery station.

7. The blow-molding machine as defined in claim 6, wherein:

said mounting means for said swing platform comprises swivel levers arranged in a substantially parallelogram-like configuration; and said swivel levers being mounted at the swing platform and a machine frame of the blow-molding machine.

8. The blow-molding machine as defined in claim 6, wherein:

said swing platform comprises a multi-part platform composed of at least two interconnected platform parts;

one of said two platform parts supporting said blow mold and the other of said two platform parts supporting said transfer means; and vibration-suppressing means provided for said multi-part platform for at least suppressing the transmission of vibrations from one platform part to the other platform part.

9. The blow-molding machine as defined in claim 8, wherein:

said mounting means for said swing platform comprises swivel lever means arranged in a substantially parallelogram-like configuration;

said swivel lever means being mounted at the swing platform and a machine frame of the blow-molding machine; and said swivel lever means comprising a plurality of individual swivel levers, some of which are connected to one of the platform parts and the machine frame and at least one other of which is connected to the other platform part and the machine frame.

10. The blow-molding machine as defined in claim 6, wherein:
   said transfer means comprise mask means disposed to opposite sides of the hollow molded bodies which are to be received therebetween and serving for the selective retention and release of the hollow molded bodies between said mask means;
   means for imparting a substantially reciprocatory movement to at least part of said mask means;
   said deflashing means comprising to-and-fro movable punch cutter means coacting with said masks means for removing flash from the hollow molded bodies held between said mask means;
   said mask means comprising at least one mask at one side of the hollow molded bodies and at least one other mask at the other side of said hollow molded bodies;
   said deflashing means including a punch device with which said one mask at the one side of said hollow molded bodies is operatively connected;
   said punch device containing said punch cutter means;
   means for moving said punch device to-and-fro along with said mask means; and
   said punch device being structured for carrying out a punching operation for deflashing the hollow molded bodies in a position of said mask means where the molded hollow bodies are retained therebetween.

11. The blow-molding machine as defined in claim 10, further including:
   locking means for releasably locking said masks with one another in a holding position thereof where they retain the hollow molded articles during the punching operation resulting in deflashing of the hollow molded bodies.

12. The blow-molding machine as defined in claim 11, wherein:
   said locking means comprises at least one locking hook member;
   means for pivotably securing said locking hook member at the one mask operatively connected with said punch device;
   said locking hook member being operatively engageable with the other mask; and
   means for moving said locking hook member into a mask holding position or mask release position as a function of the movement of the punch cutter in a direction towards and away from the hollow molded bodies, respectively.

13. The blow-molding machine as defined in claim 12, wherein:
   said means for moving said locking hook member comprises control cam means having a guide track and serving for selectively guiding said locking hook member into its holding position or release position;
   said locking hook member being structured as a double-arm lever;
   means defining a pivot point for said double-arm lever and which is located in coacting relationship with said one mask operatively connected with said punch device;
   said double-arm lever having a first lever arm guided by said guide track of said control cam means;
   said double-arm lever having a second lever arm structured for locking engagement with the other mask; and
   said other mask being proved with means for receiving said other arm of said double-arm lever.

14. The blow-molding machine as defined in claim 6, further including:
   centering pin means for fixing the position of the blow mold at the blow-molding station with respect to a blow-molding head thereof; and
   said centering pin means being arranged between said blow-molding head and said blow mold.

* * * * *